(12) United States Patent
Ruiz

(10) Patent No.: US 7,453,436 B2
(45) Date of Patent: Nov. 18, 2008

(54) HAND-HELD ON-SCREEN CONTROL DEVICE

(76) Inventor: David M. Ruiz, 17 Maybeck La., Laders Ranch, CA (US) 92694

( * ) Notice: Subject to any disclaimer, the term of this patent is extended or adjusted under 35 U.S.C. 154(b) by 607 days.

(21) Appl. No.: 10/805,037

(22) Filed: Mar. 19, 2004

(65) Prior Publication Data

US 2005/0035942 A1 Feb. 17, 2005

Related U.S. Application Data

(60) Provisional application No. 60/456,626, filed on Mar. 21, 2003.

(51) Int. Cl.
*G09G 5/00* (2006.01)

(52) U.S. Cl. ..................... 345/156; 345/163

(58) Field of Classification Search .......... 345/156–175, 345/179; 341/20–22, 176; 361/679; 348/734; 340/825.24
See application file for complete search history.

(56) References Cited

U.S. PATENT DOCUMENTS

| | | | | |
|---|---|---|---|---|
| 5,638,092 A | * | 6/1997 | Eng et al. | 345/158 |
| 6,462,732 B2 | * | 10/2002 | Mehr | 345/169 |
| 6,587,090 B1 | * | 7/2003 | Jarra | 345/156 |
| 2002/0101401 A1 | * | 8/2002 | Movahed | 345/156 |
| 2002/0163495 A1 | * | 11/2002 | Doynov | 345/156 |
| 2002/0171625 A1 | * | 11/2002 | Rothchild | 345/156 |
| 2003/0137489 A1 | * | 7/2003 | Bajramovic | 345/158 |
| 2003/0174124 A1 | * | 9/2003 | How | 345/167 |

* cited by examiner

*Primary Examiner*—Richard Hjerpe
*Assistant Examiner*—Mansour M Said
(74) *Attorney, Agent, or Firm*—Russo & Duckworth, LLP

(57) ABSTRACT

A cursor control device has an input signal reader adapted to read an input signal created by movement of a surface there across, and a signal processing component adapted to process the input signal from the reader and to communicate a corresponding signal to a controller that is directly proportional to the input signal. The device remains in a substantially constant position relative to an active hand of a person when the person is using the active hand to operate a second device.

6 Claims, 5 Drawing Sheets

HAND-HELD ON-SCREEN CONTROL DEVICE

RELATED APPLICATIONS

This application claims priority based on provisional application Ser. No. 60/456,626, filed Mar. 21, 2003.

BACKGROUND OF INVENTION

Computer cursor control devices are very common, and allow computer users to control the on-screen cursor as well as execute functions associated with the position of the cursor. For example, known computer mice provide left-click, right-click, double-click, and scrolling wheel motions. But known mice typically require extra space to store and operate due to the need for a relatively hard and smooth surface to drag the mouse across. Further, known mice require dedicated attention from a hand of the user. That is, the hand must be physically moved away from the keyboard and to the mouse in order to operate the mouse. Such limitation is awkward and inefficient.

Laptop mice have been incorporated directly into the keyboard by use of a touch pad or trackball. This allows the user to operate the mouse without moving his or her hands significantly away from the keyboard, but activation and control of such touch pad or trackball mice is awkward, inefficient and limits the users motion and ability to use a mouse without directly contacting the keyboard.

There exists hand held mice that claim to be ergonomic and efficient for multi-task environments, i.e. using the handheld mouse and typing as an integrated process. They additionally claim to be intimately positioned in the hand so as to free the hand from dedicated mouse usage. The problem heretofore is that existing hand held mice are substantially inadequate within real world applications. The ability to access the keyboard and to perform mouse-type operations requires a compact, sleek design; that provides for the three dimensional space requirements required for integrated hand, mouse and keyboard usage.

Additionally, ergonomic designs are both subjective to the end user and relative to the degree of benefit or relief that the design provides in relation to different designs. One or more devices can claim to be ergonomic in design and yet exhibit substantially different design, look and level of ergonomic benefit.

Furthermore, freedom and range of movement appears to be the next generational step in mouse technology. The ability to manipulate the curser without cumbersome restrictions such as maintaining hand and arm positions relative to a stationary object such as a mouse pad or mouse pad like surface will free the user to enjoy the near full range of upper body motion without the need to dedicate physical positioning to achieve accurate curser movement.

Thus, there is a need for an on-screen cursor device such as a mouse, that avoids the above-mentioned drawbacks and incorporates the above-mentioned benefits.

FIELD OF INVENTION

The present invention relates generally to controlling the two-dimensional (X-Y) movement of a cursor on a screen. More particularly, the invention relates to an ergonomic cursor control device which allows a user to control the X-Y movement of the cursor on the screen, as well as the execution of functions associated with the cursor position, and to maintain the device in a substantially constant position relative to the user's active hand whether the user is using the active hand to operate the device or to operate a separate device. Attachable and detachable hook and loop type holding systems maintain said hand held cursor control device in proper position. These holding systems vary depending on the desire and practical application of the user; such systems include but are not limited to a full or partial glove configuration, a digit ring, a strap, a digit ring/strap configuration.

SUMMARY OF THE INVENTION

The following device, which I have invented, satisfies the need for an improved cursor control that avoids the above-mentioned drawbacks and incorporates the above-mentioned benefits.

A device with an input signal reader adapted to read an input signal created by movement of a surface across the input signal reader; and a signal processing component adapted to process the input signal from the reader and to communicate a corresponding signal controller, wherein the corresponding signal is directly proportional to the input signal; wherein the device maintains a substantially constant position relative to an active hand of a person when the person is using the active hand to operate a second device.

The device can be hand-held. In this respect, hand-held means not only literally held, but also removable and attachable to a hand. For example, the device may be removable, attachable and secured to the hand by a strap, glove, other suitable means, or any combination thereof. The input signal reader could be an optical reader, touch pad or track-ball using technology well-known in the art. The surface can be a human skin (such as the skin of a thumb), or a different surface such as a well known mouse-pad surface. In the latter case, the surface may be worn over the thumb or a portion thereof, such as a ring, thimble, or part of a glove. In this respect, the thumb (either naked or with a mouse-pad type surface thereon), may be moved across the input signal reader (e.g., an optical reader.)

The signal processing component (also well-known in the art, or with minor modifications), then processes the signal and communicates a corresponding signal to the controller (e.g., a CPU of a computer). The corresponding signal is directly proportional to the input signal. For example, if the input signal represents a movement from left-to-right, the corresponding signal represents movement from left-to-right as well. The device may be hand-held. The device maintains a substantially constant position relative to an active hand of a person (e.g., the hand that operates the device) even when the person is using the active hand to operate a second device. That's because it is attached or secured to the active hand. But it is done so in such a manner so as not to interfere with operation of other devices, so it therefore does not need to be removed or placed aside when not in use.

The device could be a substantially T-shaped body (see FIGS. 1, 2, 3a. 3b, 3c, and 4,). It can communicate to the controller using well-known wired communications (such as USB or parallel) or wireless communications protocols. It can be shaped and sized such that it fits in the hand as seen in FIGS. 3a, 3b, 3c and 4. In these drawings, the optical reader is on the top surface of the device, and the input signals are generated by movement of the thumb (naked or adorned) across the reader. The standard mouse circuitry in this case would be re-wired to reverse the x and y inputs so that the corresponding signal sent to the controller would be directly proportional to the input signal. A person of ordinary skill in the art understands that this is required, because the standard mouse circuitry processes a signal that is inversely proportional to the input signal, inverts it back before sending it to the controller, and the controller then associates the inverted signal a command to position the cursor in direct proportion to the original signal. In other words, with a typical mouse, movement of the mouse to the left (the input signal) causes the trackball to rotate to the right. So the mouse circuitry treats the trackball rotating to the right as a request from the user (the input signal) to move the cursor to the left. In my invention as described above, the circuitry should treat movement of the surface to the right as a request from the user (the input signal) to move the cursor to the right-directionally proportional to the input signal.

Traditional mouse buttons may be on the device as well, such as left and right buttons, and a scroll wheel. In one embodiment, the device is T-shaped, with the reader on top, and the buttons on a trigger handle, so that the device may be held/worn as a joystick/gearshift. The cursor movement would be controlled by movement of the thumb in the X-Y plane (across the top of the device), and the mouse buttons would be controlled by a squeezing/trigger activation motion. Such squeezing could include any one finger or combination of any number of fingers, depending on the design, and depending on the desired mouse function (left-click, right-click, or double-click). A scroll wheel could be positioned on top of the device (adjacent the reader), or on the vertical trigger portion of the device (adjacent buttons). The buttons could be push-buttons, sliders, switches, or other suitable mechanisms.

DETAILED DESCRIPTION OF THE PREFERRED EMBODIMENTS

Figure 1:
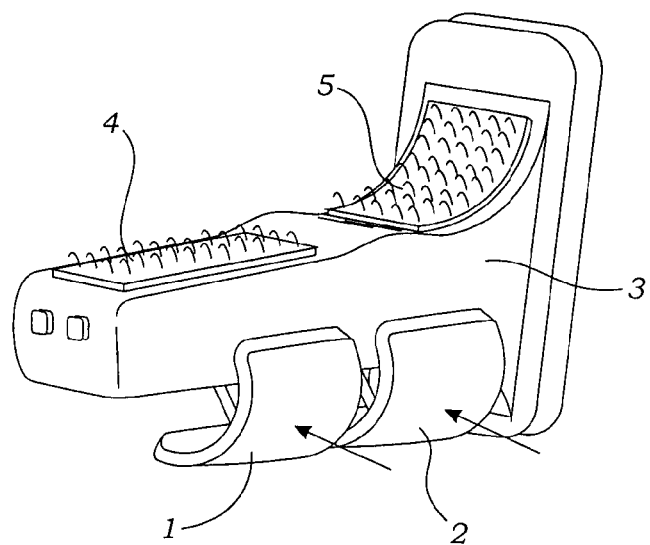
FIG. 1 is a side view representational drawing of the invention showing clickable buttons (1) and (2) extending outwardly and angled downward from the lateral (side) plane (3) of the body, and placement of hook and loop attachment strips (4) and (5).

FIG. 1 is a side view representational drawing of the invention showing clickable buttons (1) and (2) extending outwardly and angled downward from the lateral (side) plane (3) of the body, and placement of hook and loop attachment strips (4) and (5).

Figure 2:
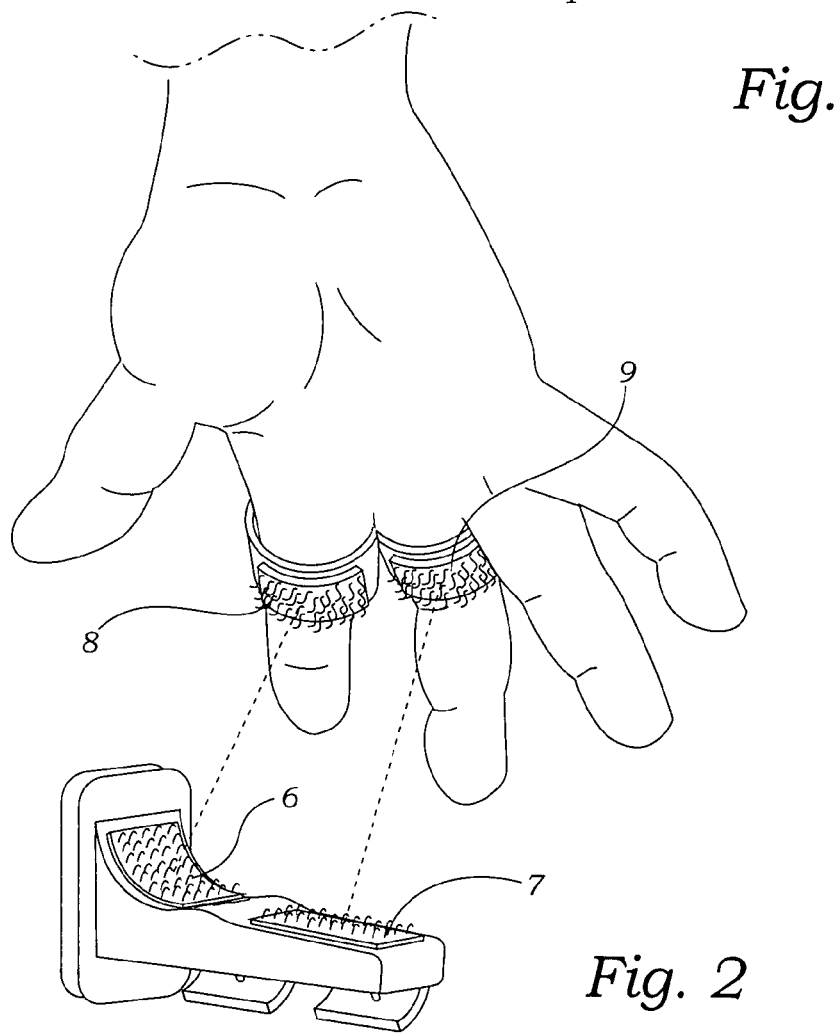
FIG. 2 is a detailed side drawing of the invention that details the detachable hook and loop type strapping system that allows the user to quickly remove or attach the device to the active hand. The hook side of the hook and loop attachment strap system has been adhered to the rear of the faceplate area (6) as well as onto the core body of the device (7) while the loop side of the strapping system has been adhered to elastized fabric rings (8) and (9) that slip onto the index and middle finger respectively. These elastized fabric finger rings with their adhered strapping system loops when placed into contact with said hook strips provide the attachment necessary to securely hold said device to the desired active hand. The choice of the loop or hook side of said strapping device being exclusive to either ring or device is not limiting since the reverse arrangement would equally secure the device to the active hand.

FIG. 2 is a detailed side drawing of the invention that details the detachable hook and loop type strapping system that allows the user to quickly remove or attach the device to the active hand. The hook side of the hook and loop attachment strap system has been adhered to the rear of the faceplate area (6) as well as onto the core body of the device (7) while the loop side of the strapping system has been adhered to elastized fabric rings (8) and (9) that slip onto the index and middle finger respectively. These elastized fabric finger rings with their adhered strapping system loops when placed into contact with said hook strips provide the attachment necessary to securely hold said device to the desired active hand. The choice of the loop or hook side of said strapping device being exclusive to either ring or device is not limiting since the reverse arrangement would equally secure the device to the active hand.

Figure 3A:
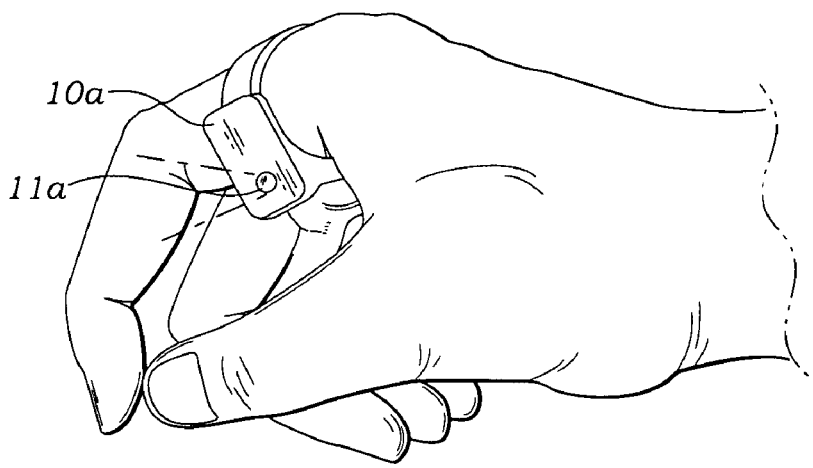
FIG. 3a is a detailed drawing showing the relative positioning of the active hand in relation to the front of the face plate (10a) of the invention that houses the optic sensor (11a) of the heretofore mentioned invention.

FIG. 3a is a detailed drawing showing the relative positioning of the active hand in relation to the front of the face plate (10a) of the invention that houses the optic sensor (11a) of the heretofore mentioned invention.

Figure 3B:
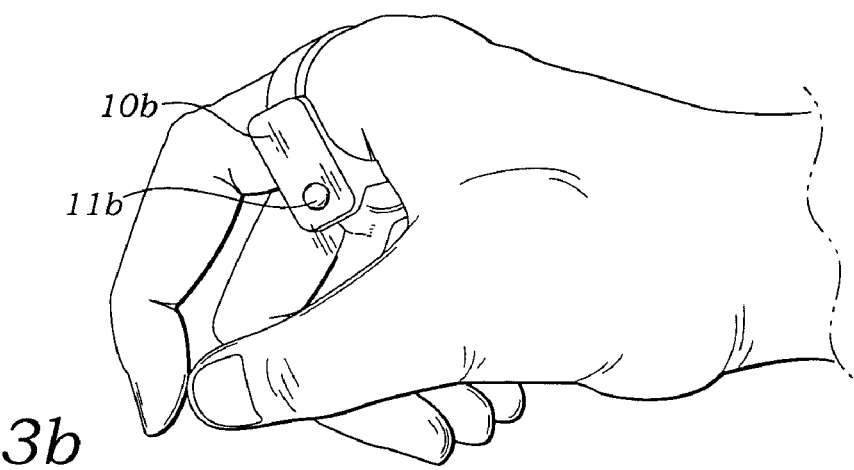
FIG. 3b is a detailed drawing showing the relative positioning of the active hand in relation to the front of the face plate (10b) of the invention that houses the touchpad sensor (11b) of the heretofore mentioned invention.

FIG. 3b is a detailed drawing showing the relative positioning of the active hand in relation to the front of the face plate (10b) of the invention that houses the touchpad sensor (11b) of the heretofore mentioned invention.

Figure 3C:
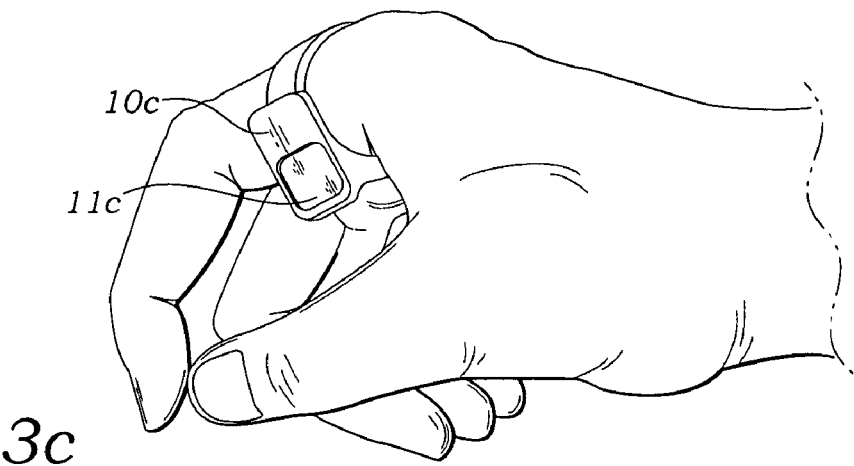
FIG. 3c is a detailed drawing showing the relative positioning of the active hand in relation to the front of the face plate (10c) of the invention that houses the trackball sensor (11c) of the heretofore mentioned invention.

FIG. 3c is a detailed drawing showing the relative positioning of the active hand in relation to the front of the face plate (10c) of the invention that houses the trackball sensor (11c) of the heretofore mentioned invention.

Figure 4:
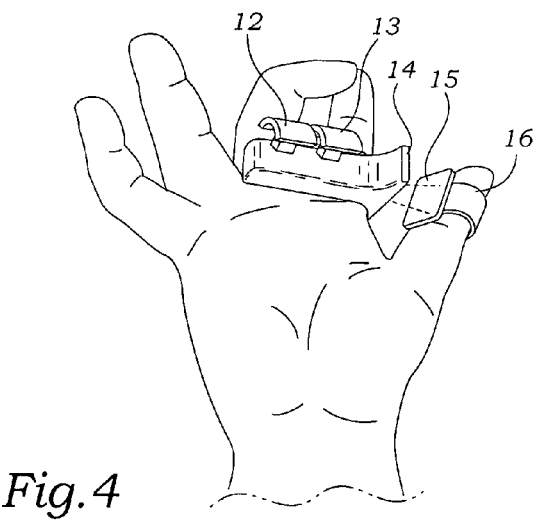
FIG. 4 is a detailed drawing showing the relative positioning of the active hand in relation to said invention. Button control placement (12) and (13) extending outwardly from the body (14) and the use of a mouse pad type surface (15) attached to a thumb ring made of elastized fabric (16).

FIG. 4 is a detailed drawing showing the relative positioning of the active hand in relation to said invention. Button control placement (12) and (13) extending outwardly from the body (14) and the use of a mouse pad type surface (15) attached to a thumb ring made of elastized fabric (16).

Figure 5:
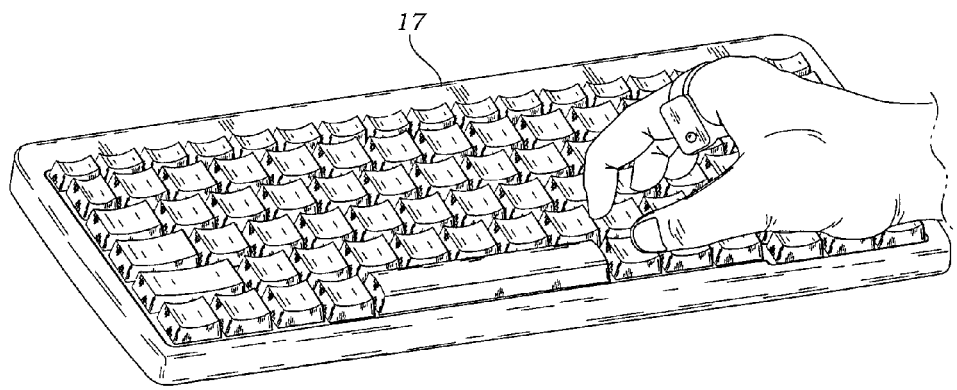
FIG. 5 is a detailed drawing showing the relative positioning of the active hand in relation to the heretofore mentioned invention whilst maintaining standard orientation and usage of a separate device, specifically as shown in this diagram as a computer keyboard (17).

FIG. 5 is a detailed drawing showing the relative positioning of the active hand in relation to the heretofore mentioned invention whilst maintaining standard orientation and usage of a separate device, specifically as shown in this diagram as a computer keyboard (17).

Figure 6:
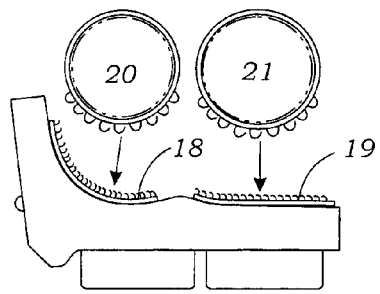
FIG. 6 is a detailed side drawing of the invention that details the detachable hook and loop type strapping system that allows the user to quickly remove or attach the device to the active hand. The hook side of the hook and loop attachment strap system has been adhered to the rear of the faceplate area (18) as well as onto the core body of the device (19) while the loop side of the strapping system has been adhered to elastized fabric rings (20) and (21) that slip onto the index and middle finger respectively. These elastized fabric finger rings with their adhered strapping system loops when placed into contact with said hook strips provide the attachment necessary to securely hold said device to the desired active hand. The choice of the loop or hook side of said strapping device being exclusive to either ring or device is not limiting since the reverse arrangement would equally secure the device to the active hand.

FIG. 6 is a detailed side drawing of the invention that details the detachable hook and loop type strapping system that allows the user to quickly remove or attach the device to the active hand. The hook side of the hook and loop attachment strap system has been adhered to the rear of the faceplate area (18) as well as onto the core body of the device (19) while the loop side of the strapping system has been adhered to elastized fabric rings (20) and (21) that slip onto the index and middle finger respectively. These elastized fabric finger rings with their adhered strapping system loops when placed into contact with said hook strips provide the attachment necessary to securely hold said device to the desired active hand. The choice of the loop or hook side of said strapping device being exclusive to either ring or device is not limiting since the reverse arrangement would equally secure the device to the active hand.

Figure 7:
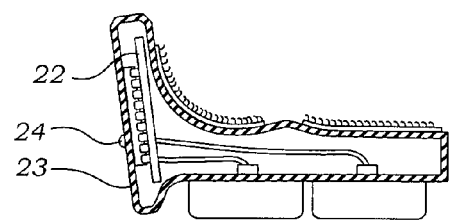
FIG. 7 is a drawing showing the orientations of an integrated chip with a built in optic sensor. The placement of such a chip (22) within the faceplate (23) of the invention provides for the containment of needed electronic circuitry and access to the optical sensor (24) within the parameters of said handheld device rather than exporting needed circuitry to a secondary location outside of the parameters of said handheld device.

FIG. 7 is a drawing showing the orientations of an integrated chip with a built in optic sensor. The placement of such a chip (22) within the faceplate (23) of the invention provides for the containment of needed electronic circuitry and access to the optical sensor (24) within the parameters of said handheld device rather than exporting needed circuitry to a secondary location outside of the parameters of said handheld device.

Figure 8:
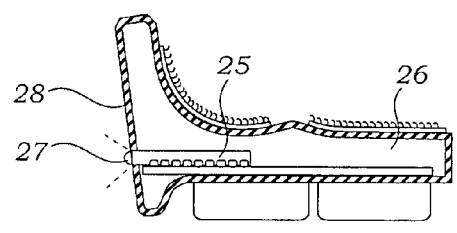
FIG. 8 is a drawing showing the orientations of an integrated chip with a built in optic sensor. The placement of such a chip (25) within the main body of the invention (26) and extending the optic sensor edge of the chip (27) into the faceplate (28) provides for the containment of needed electronic circuitry within the parameters of said invention rather than exporting needed circuitry to a secondary location outside of the parameters of said handheld device.

FIG. 8 is a drawing showing the orientations of an integrated chip with a built in optic sensor. The placement of such a chip (25) within the main body of the invention (26) and extending the optic sensor edge of the chip (27) into the faceplate (28) provides for the containment of needed electronic circuitry within the parameters of said invention rather than exporting needed circuitry to a secondary location outside of the parameters of said handheld device.

Figure 9:
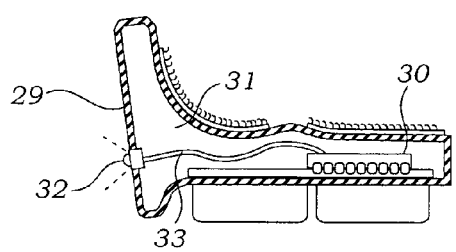
FIG. 9 is a drawings showing the orientations of an integrated chip with an attached optical cable (33) extending to the faceplate of the invention (29) The placement of such a chip (30) within the main body (31) of the invention and extending of the optical sensor (32) into the faceplate (29) provides for the containment of needed electronic circuitry within the parameters of said invention rather than exporting needed circuitry to a secondary location outside of the parameters of said handheld device.

FIG. 9 is a drawings showing the orientations of an integrated chip with an attached optical cable (33) extending to the faceplate of the invention (29) The placement of such a chip (30) within the main body (31) of the invention and extending of the optical sensor (32) into the faceplate (29) provides for the containment of needed electronic circuitry within the parameters of said invention rather than exporting needed circuitry to a secondary location outside of the parameters of said handheld device.

Figures 10, 11:
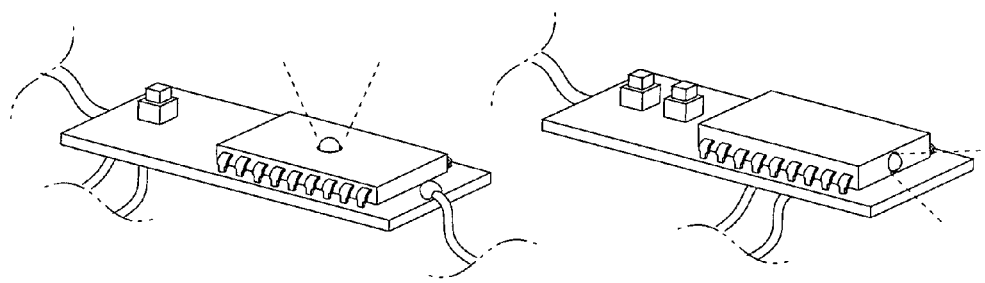
FIG. 10 is a representation of the integrated chip that is shown in FIG. 7.
FIG. 11 is a representation of the integrated chip that is shown in FIG. 8.

FIG. 10 is a representation of the integrated chip that is shown in FIG. 7.

FIG. 11 is a representation of the integrated chip that is shown in FIG. 8.

Figure 12:
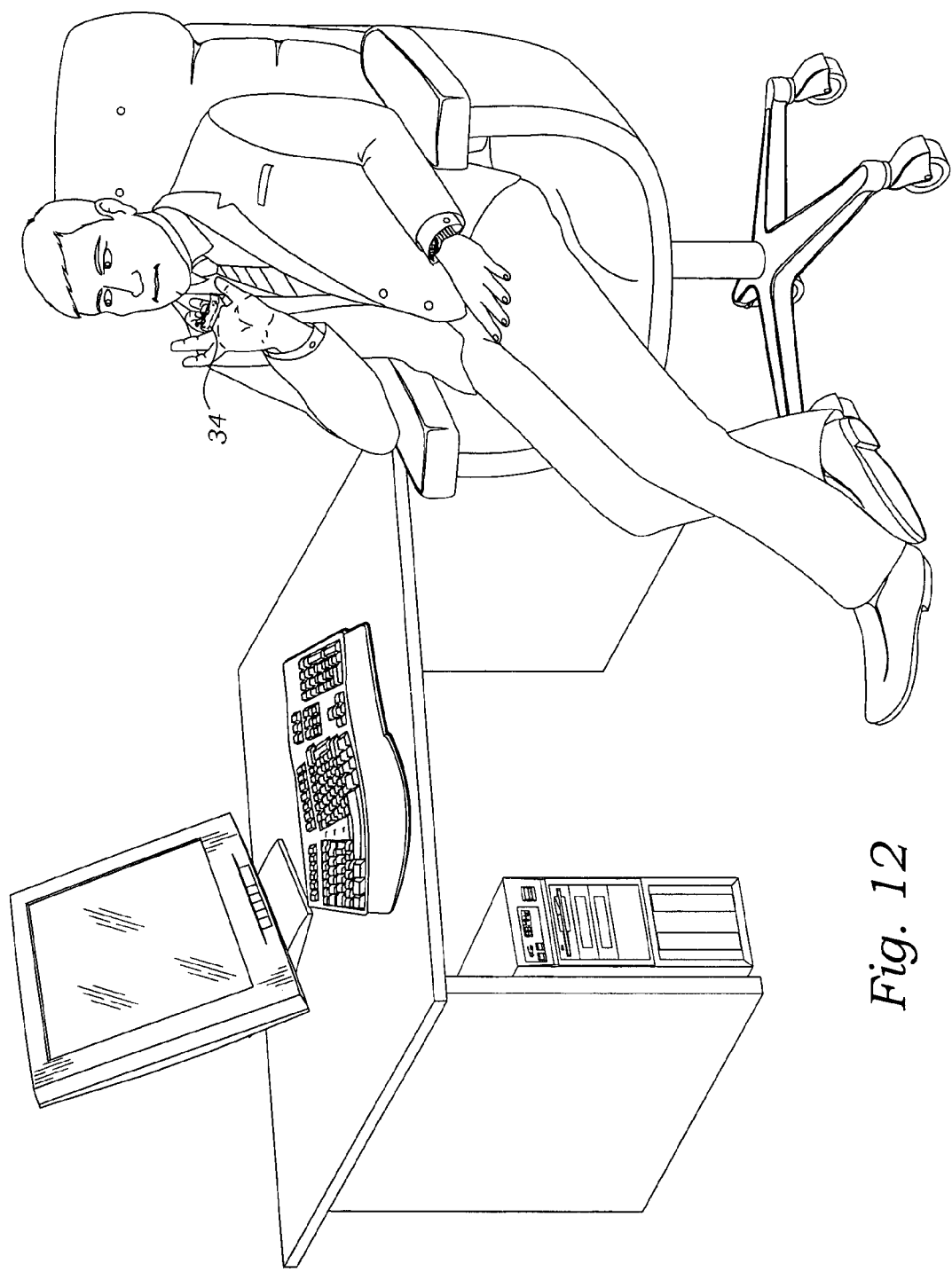
FIG. 12 is a detailed drawing showing a graphical representation of the heretofore mentioned device (34) as it is securely attached to the active hand of a representational character this device is being shown to change the curser position on the computer screen with the active hand in an example orientation of which in reality the orientation could be virtually limitless. Examples being active hand behind the head, on the arm chair, across the chest or amongst enumerable variation within space. Additionally, the device is being shown in its wireless version but is not limited by such and could just as simply be depicted in a wired version.

FIG. 12 is a detailed drawing showing a graphical representation of the heretofore mentioned device (34) as it is securely attached to the active hand of a representational character this device is being shown to change the curser position on the computer screen with the active hand in an example orientation of which in reality the orientation could be virtually limitless. Examples being active hand behind the head, on the arm chair, across the chest or amongst enumerable variation within space. Additionally, the device is being shown in its wireless version but is not limited by such and could just as simply be depicted in a wired version.

What is claimed is:

1. A computer interface controller including cursor and button controllers, the computer interface controller comprising:
   a housing adapted to reside within a person's fingers against a person's index and middle fingers;
   affixing means for attaching said housing within a person's fingers to a person's index and middle fingers;
   a cursor controller for providing X-Y control of a cursor on a computer screen, said cursor controller positioned within said housing so as to be controlled by a person's thumb when said housing is attached to a person's index and middle fingers;
   a first button member affixed to said housing, said first button member positioned so as to be depressable by a person's index finger when said housing is attached to a person's index and middle fingers; and
   a second button member affixed to said housing, said second button member positioned so as to be depressable by a person's middle finger when said housing is attached to a person's index and middle fingers.

2. The computer interface controller of claim 1 wherein said affixing means includes a pair of rings constructed of a hook or pile fastener adapted to wrap around a person's index and middle fingers, and includes a corresponding hook or pile fastener engaging said housing to allow the housing to attach to and detach from a person's index and middle fingers.

3. The computer interface controller of claim 1 wherein said cursor controller includes an optical sensor.

4. The computer interface controller of claim 1 wherein said cursor controller includes a track ball.

5. The computer interface controller of claim 1 wherein said cursor controller includes a touch pad.

6. A computer interface controller including cursor and button controllers, the computer interface controller comprising:
- a housing adapted to reside within a person's fingers against a person's index and middle fingers;
- affixing means for attaching said housing within a person's fingers to a person's index and middle fingers;
- a cursor controller in the form of an optical sensor for providing X-Y control of a cursor on a computer screen, said cursor controller positioned within said housing so as to be controlled by a person's thumb when said housing is attached to a person's index and middle fingers;
- a first button member affixed to said housing, said first button member positioned so as to be depressable by a person's index finger when said housing is attached to a person's index and middle fingers; and
- a second button member affixed to said housing, said second button member positioned so as to be depressable by a person's middle finger when said housing is attached to a person's index and middle fingers.

* * * * *